Jan. 17, 1956 R. A. NELSON 2,730,958
DRIPLESS MEASURING LIQUID DISPENSER
Filed May 24, 1954 2 Sheets-Sheet 2
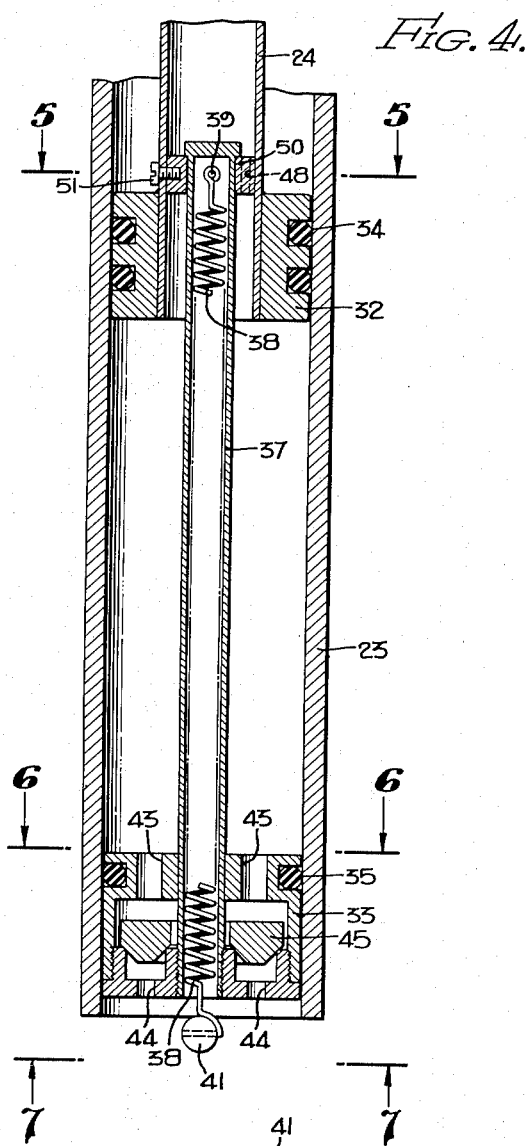
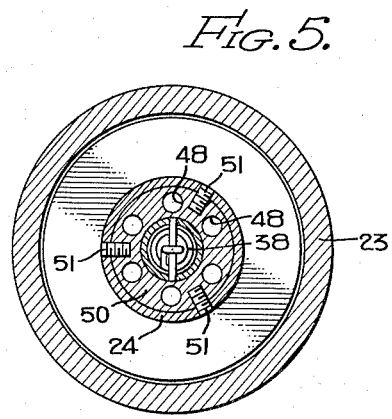
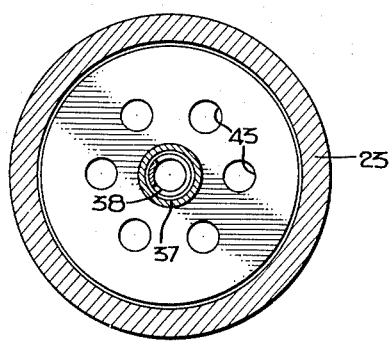
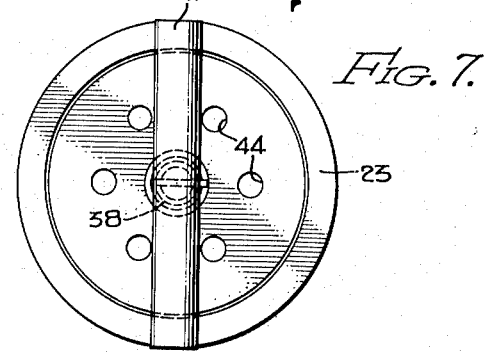
ROBERT A. NELSON,
INVENTOR.
BY
ATTORNEY

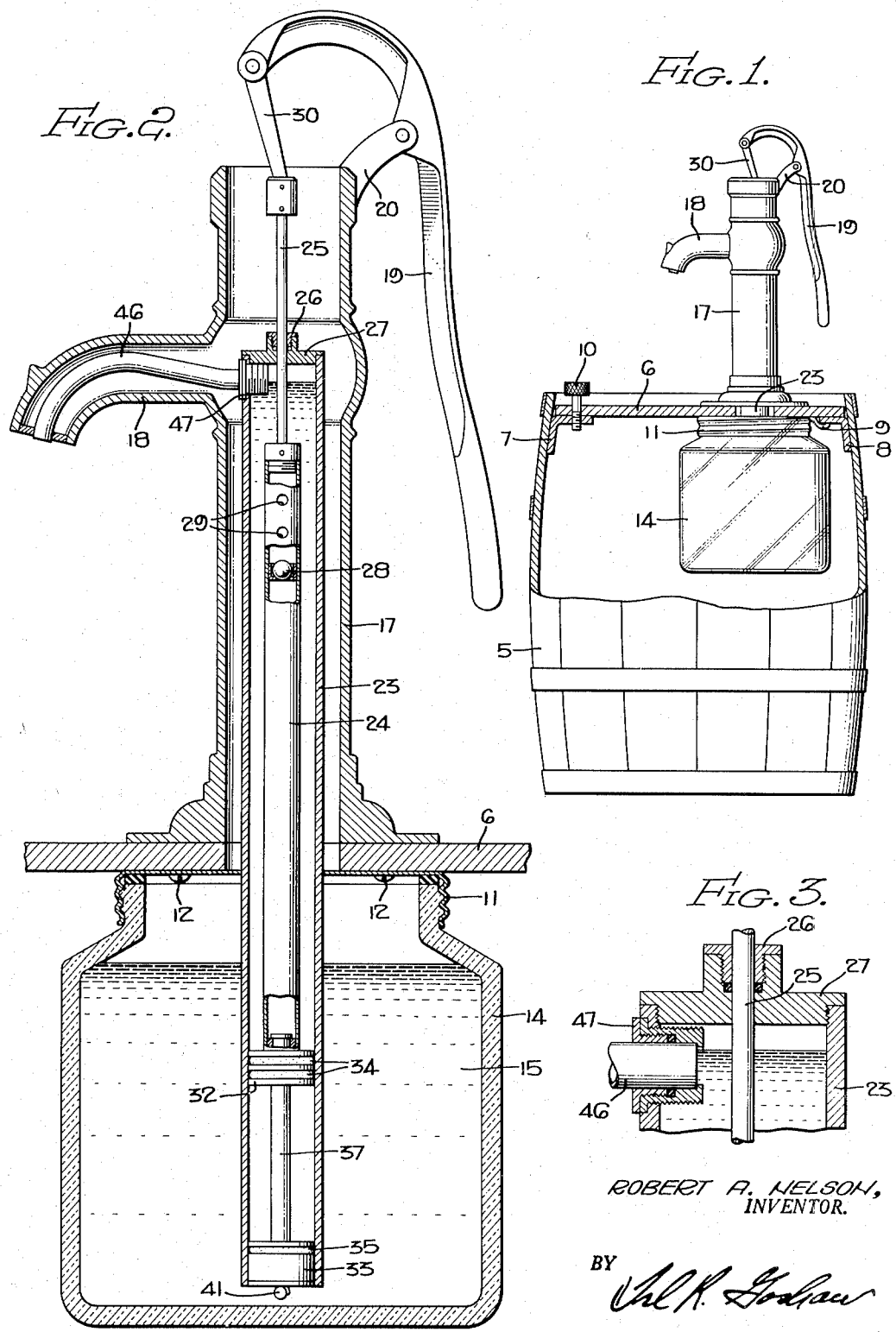

United States Patent Office 2,730,958
Patented Jan. 17, 1956

2,730,958

DRIPLESS MEASURING LIQUID DISPENSER

Robert A. Nelson, North Hollywood, Calif.

Application May 24, 1954, Serial No. 431,813

11 Claims. (Cl. 103—178)

This invention relates to liquid dispensers and particularly to a measuring liquid dispenser of the dripless type.

Liquid dispensers are well known, and particularly those in the nature of a pump having cylinders and pistons. However, many of the former pump dispensers are not dripless; that is, after the stroke is completed, quite a large number of drops will continue to fall from the outlet pipe or spout. The present invention is directed to the measuring pump type of dispenser wherein the level of the fluid at the outlet spout is automatically lowered to prevent dripping. It is useful for dispensing many types of liquids, and particularly for the dispensing of a measured amount of distilled spirits.

The principal object of the invention, therefore, is to facilitate the dispensing of a liquid.

Another object of the invention is to provide an improved liquid dispenser wherein the liquid is measured.

A further object of the invention is to provide an improved measuring liquid dispenser of the pump type which is dripless.

Although the novel features which are believed to be characteristic of this invention, both as to the manner of its organization and the mode of its operation, will be better understood from the following description when read in conjunction with the accompanying drawings, forming a part hereof, in which:

Fig. 1 is an elevational view, partly in cross-section, showing a liquid dispenser embodying the invention.

Fig. 2 is a cross sectional view of the dispenser shown in Fig. 1.

Fig. 3 is a detail view showing the upper level of the liquid at the end of a complete stroke.

Fig. 4 is a cross-sectional view of the lower portion of the pump.

Fig. 5 is a cross-sectional view taken along the line 5—5 of Fig. 4.

Fig. 6 is a cross-sectional view taken along the line 6—6 of Fig. 4, and

Fig. 7 is a bottom view taken along the line 7—7 of Fig. 4.

Referring now to the drawings, in which the same numerals indicate like elements, a keg or barrel 5 has an upper plate 6 mounted on brackets 7 and 8, and which may be locked to the brackets by a screw 10 when latch 9 is inserted under bracket 8. Under the plate 6 is a threaded connector 11, attached to the plate 6 by screws 12. Threaded to the connector 11 is a jar 14 which contains a liquid 15 to be dispensed. Mounted on top of the plate 6 is a pump casing 17 having a spout 18 and a handle 19 pivoted on a bracket 20.

Positioned within the casing 17 is an outer cylinder 23, an upper inner cylinder 24, and a lower inner cylinder 37. The cylinder 24 is connected to a rod 25 passing through a packing gland 26 in the cover plate 27, closing the upper end of cylinder 23. The rod 25 is connected to a crank arm 30 of the pump handle 19, so that strokes of the pump handle 19 will raise and lower the inner cylinder 24.

Referring to Figs. 4, 5, 6, and 7, two pistons are shown at 32 and 33, piston 32 having packing O rings 34, and piston 33 having a packing O ring 35. The liquid 15 will pass upwardly into the lower portion of cylinder 23, through holes 43 and 44 and valve 45 when external pressure raises it due to a decrease in pressure within the cylinder 23 when piston 32 is raised. In cylinder 37, and passing through piston 33, is a coil spring 38 having one end connected to the under end of cylinder 37 at 39 and the other end connected to a rod 41 extending across the lower end of outer cylinder 23. The cylinder 24, along with the piston 32, is slidable downwardly over the cylinder 37.

To dispense a certain amount of liquid, the pump handle is raised and the rod 25 and cylinder 24 move downwardly. During this action, the liquid in the lower portion of cylinder 23 which entered through the openings 43 and 44 and valve 45 in the piston 33 will flow through the openings 48 in the spider 50, and will move upwardly into the upper inner cylinder 24 past the ball check valve 28. (See Fig. 2.) The fluid above the valve 28 will then flow out of openings 29 into the upper portion of outer cylinder 23. Now, when the cylinder 24 has reached its lowest point controlled by the highest position of handle 19, a certain amount of liquid will be present above the piston 32 in the cylinder 23. Then, as the pump handle is lowered, the liquid will be forced out of the outlet pipe 46 in spout 18, which is connected through the packing gland 47, as shown in Fig. 3.

Before the pump handle 19 reaches its maximum lowest position, the spider 50 attached to cylinder 24 by screw 51 contacts the shoulder of the upper end of cylinder 37. Further lowering of the handle 19 will now raise the cylinder 37 and the piston 33 approximately ¼" above its rest position against the tension of the spring 38, the lower end of which is held in position by the rod 41. This position is illustrated in Fig. 4. Thus, the level of the liquid within the cylinder 23 is raised to the point shown in Fig. 3, and it will continue to flow through the pipe 46 as long as this level is above the highest point of the pipe 46 which has a slight upward tilt between gland 47 and its outlet.

Now, as soon as the handle 19 is released, the spring 38 will lower the cylinder 24, piston 32, and piston 33, thus dropping the liquid level below the highest point of pipe 46, as shown in Fig. 1. Therefore, any liquid between the highest point and the outlet of pipe 46 will quickly run out and any liquid between the highest point and gland 47 will run back into cylinder 23. Thus, a measured amount of liquid may be dispensed, the amount being determined by the stroke of piston 32 and the capacity of the tube 23 and dripping is prevented by the automatic lowering of the liquid level below the highest point of pipe 46. There is thus provided a liquid dispenser which will dispense an accurate and uniform amount of liquid at each stroke and which will not drip after the stroke is completed.

I claim:

1. A liquid dispenser comprising a cylinder having its lower end in liquid to be dispensed, a pair of pistons in said cylinder, means for lowering and raising one of said pistons with respect to said other piston for permitting the flow of liquid out of said cylinder during the movement of said one piston upwardly, said means including a second hollow liquid conducting cylinder coaxially positioned within said first-mentioned cylinder, said one piston being connected to the lower end of said second-mentioned cylinder and movable therewith, openings being provided at the lower end of said second-mentioned cylinder communicating with said first-mentioned cylinder below said one piston, said liquid flowing through said openings into said second-mentioned cylinder when lowered, a check valve at the lower end of said first-mentioned cylinder to permit liquid to enter the lower portion thereof, a second check valve in said second-mentioned cylinder for permitting the flow of said liquid only from the lower portion of said first-mentioned cylinder and said second-mentioned cylinder into said first-mentioned cylinder when said second cylinder is lowered into the lower portion of said first-mentioned cylinder, means for raising said other piston during the final portion of the upward movement of said first-mentioned piston, and means for automatically lowering both of said pistons.

2. A liquid dispenser in accordance with claim 1 in which said first-mentioned means includes a third inner cylinder coaxially positioned within said first-mentioned cylinder, said second-mentioned cylinder being slidable over said third-mentioned cylinder with said first-mentioned piston.

3. A liquid dispenser in accordance with claim 2 in which said second-mentioned piston is connected to the lower end of said third-mentioned cylinder adjacent the end of and within said first-mentioned cylinder.

4. A liquid dispenser in accordance with claim 3 in which a spring is enclosed within said third-mentioned cylinder, said spring having one end attached to the lower end of said first-mentioned cylinder and to the upper end of said third-mentioned cylinder.

5. A liquid dispenser comprising an outer cylinder having its lower end extending into liquid to be dispensed, a first hollow inner cylinder coaxially positioned within said outer cylinder and having its lower end coinciding with the lower end of said outer cylinder, and its other end terminating a certain distance from said end of said outer cylinder, a second hollow liquid conducting inner cylinder having its lower end enclosing and spaced from the last-mentioned end of said first-mentioned inner cylinder, and its upper end adjacent the upper end of said outer cylinder, said second-mentioned cylinder having a larger diameter than said first-mentioned inner cylinder and slidable thereover, means for sliding said second-mentioned inner cylinder over said first-mentioned inner cylinder, a lift piston attached to the lower end of said second-mentioned inner cylinder and surrounding a portion of said first-mentioned inner cylinder for raising liquid in said outer cylinder located above said piston, a check valve piston at the lower end of said outer cylinder to permit the flow of liquid only into the lower portion of said outer cylinder when said lift piston is raised and to prevent the flow of said liquid from the lower portion of said outer cylinder when said lift piston is lowered, a check valve in said second inner cylinder for permitting said liquid to flow only upwardly therethrough from the lower portion of said outer cylinder to the portion of said outer cylinder above said lift piston when said lift piston and second-mentioned inner cylinder are moved downwardly over said first-mentioned inner cylinder and to prevent the flow of said liquid from said outer cylinder above said lift piston downwardly through said second-mentioned inner cylinder, and means for conducting said liquid from the top of said outer cylinder when said lift piston and second-mentioned inner cylinder are moved upwardly.

6. A liquid dispenser in accordance with claim 5 in which resilient means are enclosed within said first-mentioned inner cylinder, said means being attached to the lower end of said outer cylinder and to the upper end of said first-mentioned inner cylinder.

7. A liquid dispenser in accordance with claim 6 in which are provided means at the upper end of said first-mentioned inner cylinder and means at the lower end of said second-mentioned inner cylinder, said means being adapted to contact for raising said first-mentioned inner cylinder and said check valve piston when said contact means contact during the final portion of the movement of said second-mentioned inner cylinder upwardly, said resilient means returning both of said inner cylinders, said lift piston, and said check valve piston, to their normal rest position within said outer cylinder, the lowering of said lift piston lowering the upper level of the liquid in the outer cylinder above said lift piston below said liquid conducting means at the top of said outer cylinder.

8. A liquid dispenser in accordance with claim 7 in which said liquid conducting means at the top of said outer cylinder is an outlet pipe having a high point between its outlet and the outlet from said outer cylinder.

9. A dripless measuring liquid dispenser comprising a vertically disposed outer cylinder, a first inner cylinder coaxially positioned with respect to said outer cylinder and partially extending over the length of said outer cylinder, a second inner cylinder coaxially positioned with respect to said other cylinders and having a larger diameter than said first-mentioned inner cylinder, a liquid lifting piston on the lower end of said second-mentioned inner cylinder and adapted to slide along the length of said first-mentioned inner cylinder along with a portion of said second-mentioned inner cylinder, a check valve piston attached to the lower end of said first-mentioned inner cylinder and positioned within and at the lower end of said outer cylinder to permit liquid to flow only into said outer cylinder, means for raising and lowering said second-mentioned inner cylinder and said lift piston attached thereto, openings being provided between said outer cylinder below said lift piston and said second-mentioned inner cylinder to permit liquid to flow into said second-mentioned inner cylinder when said second-mentioned inner cylinder and said lift piston are lowered, a valve in said second-mentioned inner cylinder to permit the flow of said liquid therein only into said outer cylinder above said lift piston, and to prevent the flow of said liquid from the upper portion of said outer cylinder to the lower portion thereof, the raising of said second-mentioned inner cylinder and said lift piston raising the liquid in said outer cylinder, means for conducting said liquid from the upper end of said outer cylinder when said lift piston is raised, and means attached to the upper end of said first-mentioned inner cylinder and the lower end of said second-mentioned inner cylinder for engaging the lower end of said second-mentioned inner cylinder with the upper end of said first-mentioned inner cylinder to raise said first-mentioned inner cylinder and its check valve piston during a portion of the movement of said second-mentioned inner cylinder upwardly.

10. A dripless measuring liquid dispenser in accordance with claim 9 in which said raising and lowering means is a rod and handle attached to the upper end of said second-mentioned cylinder.

11. A dripless measuring liquid dispenser in accordance with claim 10 in which a spring is provided within said first-mentioned inner cylinder having one end attached to the lower end of said outer cylinder and to the upper end of said first-mentioned inner cylinder for moving both of said inner cylinders and said respective pistons attached thereto downwardly to lower the upper level of said liquid in said outer cylinder by lowering the liquid above said lift piston.

No references cited.